(12) United States Patent
Nierenberg

(10) Patent No.: US 9,298,851 B2
(45) Date of Patent: Mar. 29, 2016

(54) PRESENTING RELATED SEARCHES ON A TOOLBAR

(75) Inventor: Julie Nierenberg, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 124 days.

(21) Appl. No.: 13/102,514

(22) Filed: May 6, 2011

(65) Prior Publication Data

US 2012/0284293 A1    Nov. 8, 2012

(51) Int. Cl.
*G06F 17/30* (2006.01)

(52) U.S. Cl.
CPC ...... *G06F 17/3097* (2013.01); *G06F 17/30654* (2013.01)

(58) Field of Classification Search
CPC ............... G06F 17/30864; G06F 17/30867; G06F 17/3087; G06F 17/3064; G06F 17/30887; G06F 17/30637; G06F 17/30896; G06F 11/3438; G06F 17/30716; G06F 17/30861; G06F 17/30873; G06F 17/30964; G06F 2201/87

See application file for complete search history.

(56) References Cited

U.S. PATENT DOCUMENTS

| | | | |
|---|---|---|---|
| 7,685,209 B1 | 3/2010 | Norton et al. | |
| 8,041,701 B2 * | 10/2011 | Amato et al. | 707/707 |
| 8,412,699 B1 * | 4/2013 | Mukherjee et al. | 707/713 |
| 2002/0103786 A1 | 8/2002 | Goel | |
| 2005/0172262 A1 | 8/2005 | Lalwani | |
| 2006/0036966 A1 * | 2/2006 | Yevdayev | 715/779 |
| 2006/0101514 A1 * | 5/2006 | Milener et al. | 726/22 |
| 2006/0195442 A1 | 8/2006 | Cone et al. | |
| 2006/0248060 A1 | 11/2006 | Silverberg et al. | |
| 2006/0248078 A1 | 11/2006 | Gross et al. | |
| 2006/0265417 A1 * | 11/2006 | Amato et al. | 707/102 |
| 2007/0244900 A1 | 10/2007 | Hopkins et al. | |
| 2007/0288514 A1 * | 12/2007 | Reitter et al. | 707/104.1 |
| 2008/0082905 A1 * | 4/2008 | Martinez et al. | 715/205 |

(Continued)

FOREIGN PATENT DOCUMENTS

CN          101281522 A        10/2008

OTHER PUBLICATIONS

Notification of Transmittal of the International Search Report and the Written Opinion of the International Searching Authority, or the Declaration in PCT/US2012/036703, 9 pages.

(Continued)

*Primary Examiner* — Angelica Ruiz
(74) *Attorney, Agent, or Firm* — Jessica Meyers; Jim Ross; Micky Minhas

(57) ABSTRACT

Computer-readable media and computerized methods for automatically presenting keyword(s) within a search box of a toolbar are provided. The methods involve detecting a navigation action invoked by a user of a web browser and pulling from the web browser a uniform resource locator (URL) targeted by the navigation action. The targeted URL is compared against a manifest of suggested search terms to determine a match. When there exists suggested search term(s) that correspond with the URL, keyword(s) are selected from the suggested search term(s) for presentation within the search box. When no suggested search terms are found to correspond with the URL, the search box is left empty. Generally, a first search service is responsible for enabling the user to visit an online location associated with the URL, while a second search service is responsible for managing content within the search box of the toolbar.

20 Claims, 10 Drawing Sheets

(56) References Cited

U.S. PATENT DOCUMENTS

| | | | |
|---|---|---|---|
| 2008/0086496 A1* | 4/2008 | Kumar et al. | 707/102 |
| 2008/0313144 A1* | 12/2008 | Huston | 707/3 |
| 2009/0144234 A1 | 6/2009 | Sharif | |
| 2010/0042611 A1 | 2/2010 | Cruzada | |
| 2010/0070448 A1* | 3/2010 | Omoigui | 706/47 |
| 2010/0070851 A1* | 3/2010 | Chen et al. | 715/236 |
| 2010/0088629 A1 | 4/2010 | Xu et al. | |
| 2010/0131529 A1 | 5/2010 | Kasera | |
| 2010/0228710 A1* | 9/2010 | Imig et al. | 707/706 |
| 2011/0072033 A1* | 3/2011 | White et al. | 707/768 |
| 2011/0202520 A1* | 8/2011 | Teran et al. | 707/708 |
| 2011/0219291 A1* | 9/2011 | Lisa | G06F 17/30651 715/207 |
| 2011/0264673 A1* | 10/2011 | White et al. | 707/750 |
| 2012/0271805 A1* | 10/2012 | Holenstein et al. | 707/706 |

OTHER PUBLICATIONS

"Do More with your Browser's Search Box", Retrieved on: Dec. 24, 2010 Available at: http://www.labnol.org/software/browser-search-box-uses/14134/.

"ExtraTorrent Toolbar for Internet Explorer Description", Retrieved on: Dec. 24, 2010 Available at: http://www.softpedia.com/get/Tweak/Browser-Tweak/ExtraTorrent-Toolbar-for-Internet-Explorer.shtml.

O'Leary, Mick, "Smart Search Engines Find Best Facts", Retrieved on: Dec. 24, 2010 Available at: http://www.allbusiness.com/technology/software-services-applications-search-engines/11464099-1.html.

"Digger Related Search: Alternative & Related Search Keywords", Retrieved on: Dec. 24, 2010 Available at: http://textdigger.com/main/related-search.html.

"Second Office Action Received for Chinese Patent Application No. 201280021992.5" mailed Dec. 24, 2014, 8 pages.

European Supplementary Search Report dated Dec. 18, 2014 in Application No. 12781810.2, 5 pages.

First Office Action and Search Report Issued in China Patent Application No. 201280021992.5, Mailed Date: Jun. 25, 2014, 13 Pages.

"Third Office Action Issued in China Patent Application No. 201280021992.5", Mailed Date: Apr. 7, 2015, 6 Pages.

"Search Report Issued in European Patent Application No. 12781810.2", Mailed Date: Apr. 13, 2015, 11 Pages.

* cited by examiner

— 1 —
PRESENTING RELATED SEARCHES ON A TOOLBAR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Various techniques exist that enable Internet-based search engines to receive and process queries from users and to provide search results based thereon. Because these search engines are typically coupled with data stores, other queries, search results, and various search data may be conveniently stored for subsequent access. For instance, related searches that are generally associated with a query or specifically associated with a user may be discovered. However, existing technology fails to present those related searches in an intuitive manner once a user had navigated away from a search-result page.

For example, the existing methods are configured to offer users a standard search experience that involves locating and presenting a list of search results on a user interface (UI) display area and, perhaps, surface related searches on the UI display area as well. However, as users navigate away from the list of search results, they may realize that the navigated-to website may not contain the information they are seeking. Thus, when a user is no longer viewing the search results, existing UIs are inadequate for continuing to provide related searches to the user as a reminder. Accordingly, employing a procedure to supply and display related searches while the user is navigating across a number of web sites would enhance a user's experience researching a particular topic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally related to computer-readable media and computerized methods for supplying and displaying related searches while the user is navigating across a number of websites when researching a particular topic. These "related searches" broadly relate to a term or phrase offered by a search-based keyword tool, such as a backend application programming interface (API), that supplies search suggestions based on search parameters. These "search parameters" may comprise web-location information (e.g., uniform resource locations (URLs) or subject matter of a website being currently visited by the user), the query, the search results, specific user search history, general user behavior, popular searching trends, or any combination thereof. In an exemplary embodiment, the related searches are presented to a user in a display area, or "search box," within a navigation toolbar application (hereinafter "toolbar"). This search box represents any display area that is managed by a web-search service that is capable of prompting a user with one or more related searches.

As such, by presenting the term or phrase of the related searches within a portion of the navigation toolbar, the user is prompted with concepts relevant to the initial query that assist with reaching the user's true search intent. Further, by presenting the related search within the navigation toolbar, the user may be prompted by the related search even after navigating away from an initial search-results page.

BRIEF DESCRIPTION OF THE DRAWINGS

The present invention is described in detail below with reference to the attached drawing figures, wherein.

DETAILED DESCRIPTION

Figure 1:
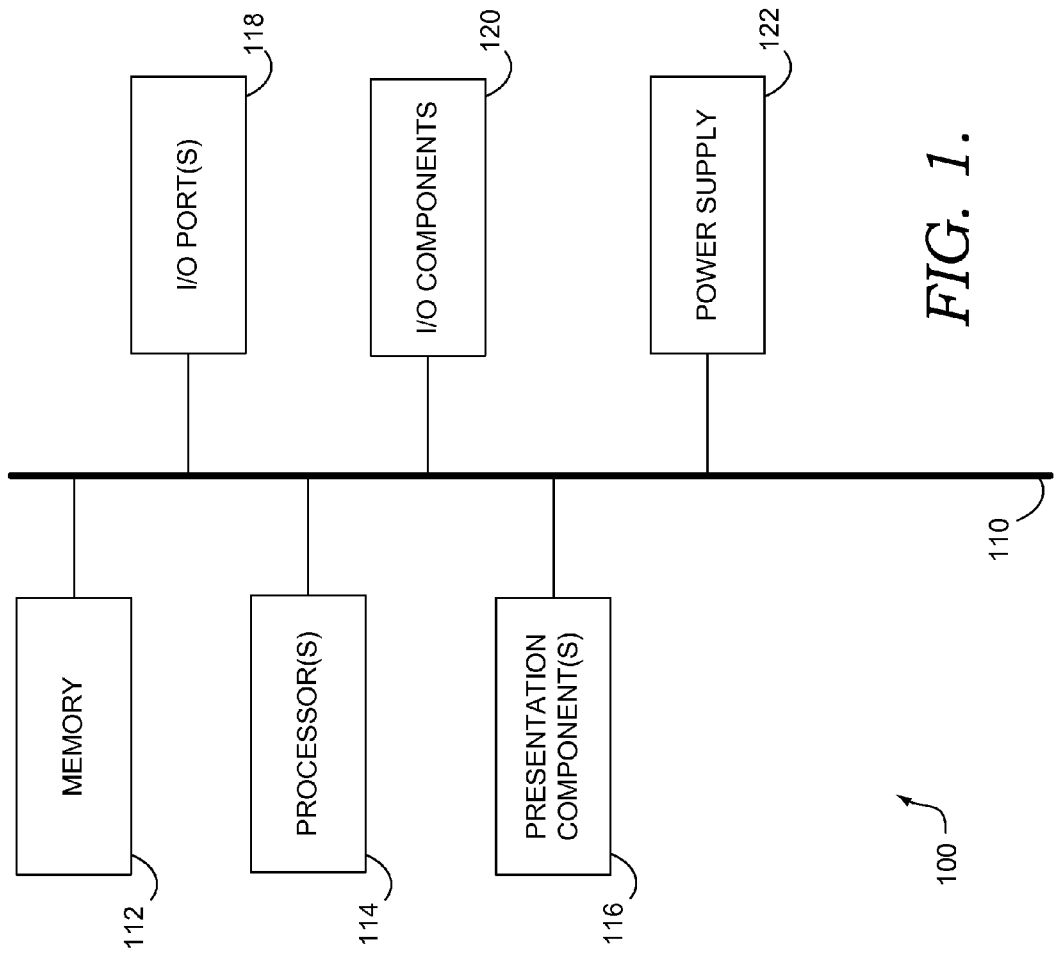
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of the present invention introduce technology for presenting to a user related searches that pertain to a web-location, such as a uniform resource locator (URL), that a user is currently visiting. In an exemplary embodiment, one or more of the related searches are presented to the user within a search box of a toolbar. This toolbar is typically rendered by a web-browsing application along with a display area that reveals content of the web-location, such as an online HTML document. The related searches may be generated by a backend mechanism, or application programming interface (API), that is responsible for discovering terms and/or phrases that are predetermined to be relevant to the URL of the currently visited web-location.

Accordingly, in one embodiment, the present invention relates to computer-executable instructions, embodied on one or more computer-readable media, that perform a method for surfacing one or more suggested search terms within a search box of a toolbar. Initially, the method includes receiving information that describes an online web-location. This information may include the URL of a web page or website the user is presently visiting or attempting to navigate towards. In one instance, one or more suggested search terms are determined as a function of the web-location information. At least one keyword is selected from the suggested search term(s). This selected keyword may then be presented within the search box of the toolbar upon the user viewing content of the web page or website targeted by the URL.

In another embodiment, aspects of the present invention involve a computerized method, implemented at a processing unit, for automatically providing a user with one or more suggested search terms. The method includes extracting web-location information from a web-browsing application. As mentioned above, the web-location information may include a URL of a website the user is currently visiting. The method additionally includes performing a comparison against a manifest to retrieve the suggested search term(s). In an exemplary embodiment, performing the comparison involves one or more of the following steps: inspecting entries within the manifest with regard to the web-location information; and, when an entry of the manifest corresponds with the web-location information, designating the entry as one of the suggested search term(s). In the alternative, when no entries of the manifest correspond with the web-location information, the method includes returning a null set that indicates no suggested search terms are to be displayed. In this case, a search box of a toolbar may be left empty. However, when there exists suggested search term(s), one or more of these suggested search term(s) may be presented within the search box of a toolbar. As discussed more fully with respect to FIG. 2, the toolbar is surfaced at a UI display upon invoking the web-browsing application.

In yet another embodiment, the present invention encompasses a computer system capable of discovering and presenting one or more suggested search terms within a toolbar. As described more fully below, the computer system comprises a processing unit coupled to a computer storage medium, where a plurality of computer software components executable by the processing unit are stored on the computer storage medium. The computer software components include a web-browsing application, a first search service, and a second search service. The web-browsing application is generally configured to receive a user-initiated selection directed to a destination link that, at some point, initiates navigation to a web location. The first search engine, which is typically operated by a first web-search service, is configured to navigate the user to the web location targeted by a URL. The second search engine, which is typically operated by a second web-search service, is configured to manage content presented within a search box of the toolbar.

In one instance, the process of managing content comprises one or more of the following steps carried out by the second web-search service: determining one or more suggested search terms that are relevant to the URL; selecting at least one keyword from the suggested search term(s); and presenting the selected keyword(s) within the search box of the toolbar. Selecting may include ranking the suggested search terms in the context of relevance to the URL, or to the user's profile in conjunction with the URL, and designating as the selected keyword(s) those suggested search terms that are ranked as being of highest relevance. As mentioned below, those suggested search terms of lower relevance may be iteratively cycled through the search box, in accordance with configuration settings of the toolbar.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
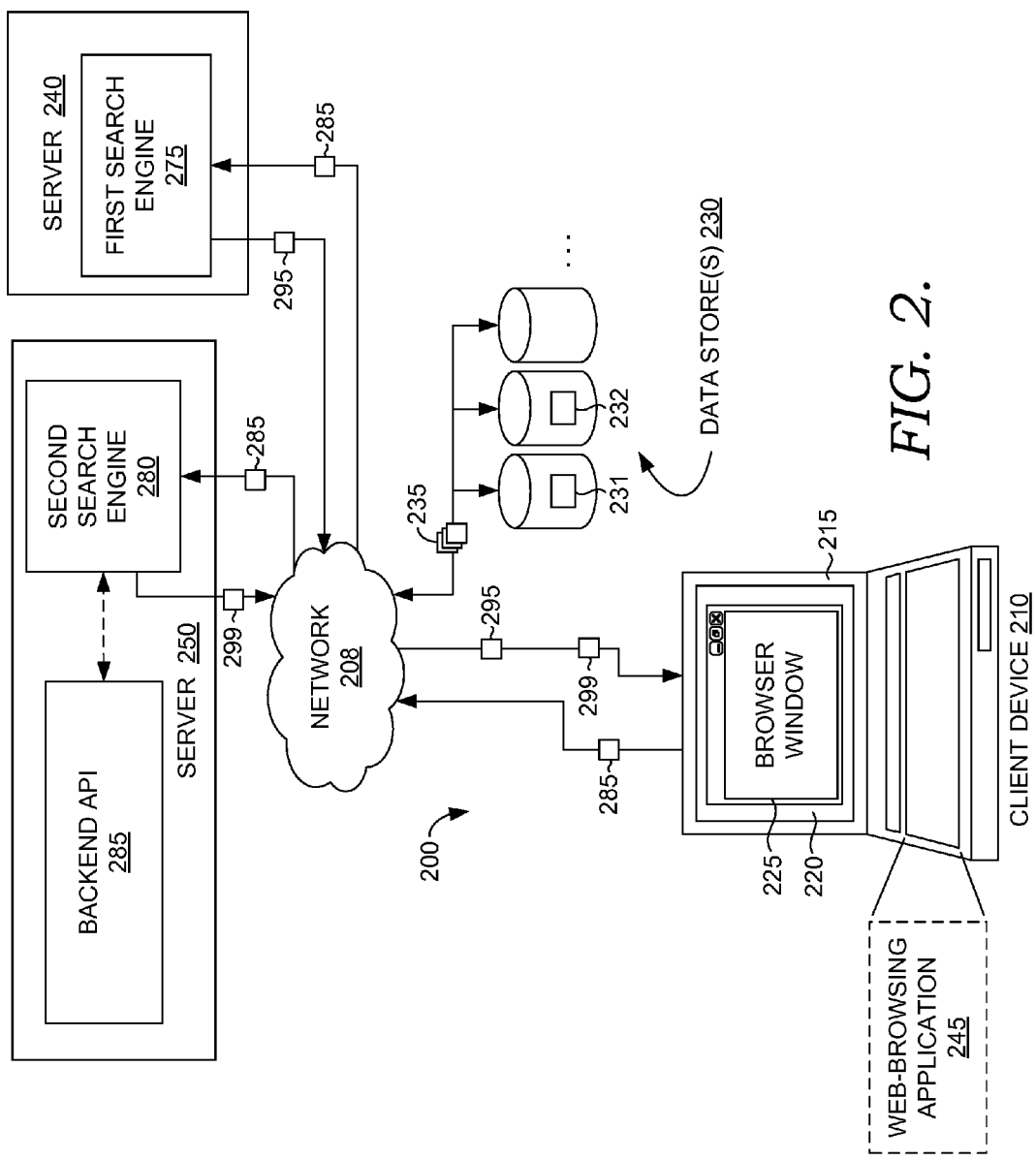
FIG. 2 is a block diagram illustrating a distributed computing environment, suitable for use in implementing embodiments of the present invention, that is configured to ascertain a set of suggested search terms or phrases that are employed for eventual display at a toolbar of a user interface (UI) display.

A process for automatically generating a set of related searches and offering one or more of the related searches to the user via a toolbar will now be discussed with reference to FIG. 2. In particular, FIG. 2 depicts a block diagram that illustrates an exemplary system architecture 200 of a distributed computing environment, suitable for use in implementing embodiments of the present invention. It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a client device 210, data stores 230, a server 240, a server 250, and a network 208 that interconnects each of these items. Each of the client device 210, the data stores 230, and the servers 240 and 250, shown in FIG. 2, may take the form of various types of computing devices, such as, for example, the computing device 100 described above with reference to FIG. 1. By way of example only and not limitation, the client device 210 and/or the servers 240 and 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210, 240, and 250 includes, or is linked to, some form of a computing unit (e.g., central processing unit, microprocessor, etc.) to support operations of the component(s) running thereon (e.g., first search engine 275, second search engine 280, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210, 240, and 250 to enable each device to perform communication-related processes and other operations (e.g., processing user inputs 285, providing outcomes 295 to the user inputs 285, generating related searches 299, and the like). In another instance, the computing unit may encompass a processor (not shown) coupled to the computer-readable medium accommodated by each of the devices 210, 240, and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., selecting a keyword from the related searches 299 to be displayed within the search box).

Also, beyond processing instructions, the processor may transfer information to and from other resources that are integral to, or disposed on, the devices 210, 240, and 250. Generally, resources refer to software components or hardware mechanisms that enable the devices 210, 240, and 250 to perform a particular function. By way of example only, the resources accommodated by the server 250 may include one or more of the following: the second search engine 280 and a backend API 285. Further, the client device 210 may include resources, such as a client application (not shown) that is capable of installing and running a toolbar and a web-browsing application 245 that interacts with the toolbar.

The client device 210 may include an input device (not shown) and a presentation device 215. Generally, the input device is provided to receive input(s) affecting, among other things, a presentation of search results, a toolbar, or web-page content within a browser window 225 surfaced at a UI display area 220. Illustrative input devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool on the search results responsive to the query.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with search results (e.g., digital images). In another exemplary embodiment, the presentation device 215 is capable of rendering other forms of media (e.g., audio signals). In yet another exemplary embodiment, the presentation device 215 may present a toolbar with content (e.g., related searches) revealed in a search box, as more fully discussed below.

The data store(s) 230 are generally configured to store information that facilitates generating related searches that are relevant to the user's current context of a search session. In various embodiments, such information may include, without limitation, a search-history log 231 that includes recorded user search behavior (e.g., query logs, related searches list, etc.), a manifest 232 that lists URLs that are predefined as prompting related searches, and other information that pertains to embodiments of the present invention. In addition, the data store(s) 230 may be configured to be searchable for suitable access of the stored information 235. For instance, the data store(s) 230 may be searchable for one or more previous user-initiated queries submitted by a user within the ongoing search session.

It will be understood and appreciated by those of ordinary skill in the art that the information 235 stored in the data store(s) 230 may be configurable and may include any information relevant to the generation and display of relates searches 299. The content and volume of such information are not intended to limit the scope of embodiments of the present invention in any way. Further, though illustrated as single, independent components, the data store(s) 230 may, in fact, be a plurality of databases, for instance, a database cluster, portions of which may reside on the client device 210, the servers 240 and 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the computing devices 210, 240, and 250, the storage devices 230, and components 245, 275, 280, and 285 as illustrated. In some embodiments, one or more of the components 245, 275, 280, and 285 may be implemented as stand-alone devices. In other embodiments, one or more of the components 245, 275, 280, and 285 may be integrated directly into the servers 240 and 250, respectively, or on distributed nodes that interconnect to form the servers 240 and 250. It will be understood by those of ordinary skill in the art that the components 245, 275, 280, and 285 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210, and although only one server 250 is shown, the server 250 may include separate devices that host the second search engine 280 and the backend API 285 individually).

Further, the devices of the exemplary system architecture 200 may be interconnected by any method known in the relevant field. For instance, the servers 240 and 250, as well as the client device 210, may be operably coupled via a distributed computing environment that includes multiple computing devices coupled with one another via one or more networks 208. In embodiments, the network 208 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 245, 275, 280, and 285 are designed to perform a process for recommending and displaying on a toolbar search term(s) and/or suggested queries as a function of a navigated-to URL. As a result, exposing within the toolbar the search term(s) related to the URL allow users to easily search on the related search term(s) and expeditiously satisfy the intent of their ongoing search session. Consequently, upon displaying the related search term(s) within a portion (e.g., search box) of the toolbar, users may be more apt to explore/conduct additional searches with the related search term(s) upon navigating away from a search-results page.

Accordingly, the components 245, 275, 280, and 285 are designed to act in concert to supply and display related search term(s), or related searches, while the user is navigating across a number of websites when researching a particular topic. As used herein, these "related searches" broadly relate to a term or phrase offered by a search-based keyword tool, such as the backend API 285. The scope of items encompassed by the phrase related searches is meant to be broad, and may cover such items as a character, a single term or synonym, phrase(s) related to an identifier of the navigated-to webpage, relevant keywords, and alternate equivalent queries (e.g., queries submitted by other users that conducted a search session with a similar context). Accordingly, suggested search term(s), keyword(s), and related search(es) are used interchangeably herein. In operation, the related searches are offered to help the user pick queries that may lead to more focused search results.

Initially, the web-browsing application 245 is triggered to install and provision a toolbar on the client device 210 as an add-on app. The trigger may be a user-initiated download of a navigational toolbar application from a local or remote source (e.g., prompted by a solicitation from the second search engine 280), or an automatic download from a search service (e.g., Bing®). Once installed, the toolbar is surfaced upon the user launching the web-browsing application 245. The toolbar may operate to receive queries or keywords from the user to initiate a navigation event. Or, the toolbar may operate to selectively present related searches 299 upon detecting a navigation event received at the web-browsing application 210. In an exemplary embodiment, the queries may be received and the related searches 299 may be presented at a common display area (e.g., search box) integrated within the toolbar.

The phrase "navigation event" is meant to be interpreted broadly and may be invoked upon receiving the user input 285. By way of example, the navigation event may include navigating the user away from a search-results page and toward an online document (e.g., web page of a website) associated with a specific URL. In this example, the navigation event is invoked upon a user selecting a destination link (e.g., user input 285 directed to clickable text of a hotlink) associated with a search result. In another example, the navigation event may include receiving an entry of a query within the search box of toolbar and detecting a command to submit the entry to a search engine 275 or 280. Although various different search events have been described, it should be understood and appreciated that other types of suitable search events and/or user inputs 285 may be used to invoke generation of related searches, and that embodiments of the present invention are not limited to those examples described herein.

In embodiments, a user may visit a particular online location or web site via the web-browsing application 245 intercommunicating with the first search engine 275 managed by a first search service. Upon, the user selecting a link at the online location (e.g., click-action input 285 directed to a destination link) or entering another query that targets a specific web address, the user may be navigated to an outcome 295 of the user input 285, such as a subject URL. If the content underlying the subject URL is not of interest to the user (i.e., the web site lacks the material that the user is seeking), the user may rely upon guidance from a related-search term or phrase surfaced within the toolbar in order to productively continue the search session. This related search term or phrase may be provided by the second search engine 280 managed by a second search service, as discussed immediately below.

When the toolbar is actively running in tandem with the web-browsing application 245, the toolbar may be configured to extract information describing the online web location (e.g., subject URL) that the user is currently visiting. This information may be conveyed via the network to the second search engine 280. The second search engine 280 is configured to call the backend API 285 with the subject URL. In turn, the backend API 285 is able to process the subject URL and, potentially, deliver the related searches 299 for display at the toolbar. In this way, the toolbar is able to solicit, retrieve, and present the related searches 299 that are relevant to the online web location that the user is visiting.

In one embodiment, processing the subject URL at the backend API 285 involves accessing search-history logs 231 at the data stores 230 for consideration in generating the related searches 299. In another embodiment, processing the subject URL at the backend API 285 involves accessing the manifest 232 at the data stores 230 for consideration in generating the related searches 299. In general, the manifest, or "white list," represents an aggregation of preselected URLs that will produce at least one related search. Accordingly, by limiting the number of URLs that may generate related searches, the system avoids overloading the second search service by refraining from processing every obscure navigation event.

Upon accessing the manifest 232, the backend API 285 may perform a comparison against the manifest 232 to retrieve one or more suggested search terms, or related searches 299. When an entry (e.g., preselected URL) of the manifest 232 corresponds with the web-location information (e.g., subject URL), the entry may be designated as one of the suggested search terms to be displayed at the toolbar. Or, in another instance, this procedure may occur at the second search service 280. In this instance, when the web-location information corresponds with an entry of the manifest 232, the second search service 280 is enabled to make the call to the backend API 285 to process the subject URL. As mentioned above, the related searches 299 may be derived from the subject URL alone or the subject URL in conjunction with user history (e.g., previously inputted search terms) and/or search behavior from the log 231.

In yet another embodiment, the related searches 299 may be mapped to entities of the manifest 232, while the online location information may be mapped to subject entities. As used herein, the term "entities" generally refers to an abstract object that captures a search intent of the user. Generally, abstract objects may be thought of as characterizations of a concept being searched, a field of interest researched by the user, or an intended task extrapolated from the user's search session. For example, entities may include a person (e.g., Michael Jackson), a place (e.g., Dubuque, Iowa), a thing (e.g., surfboard), class (e.g., animals), category (e.g., sports), task (e.g., plan a trip), specific action (e.g., book a flight), and the like. If, upon comparison to the manifest 232, the subject entity matches a manifest entity, then the search terms associated with the matched manifest entity are designated as one or more of the related searches 299. Upon receiving the related searches 299 at the second search engine 280, keywords selected from the related searches 299 may be presented to the user within the search box of the toolbar.

Alternatively, if no entries of the manifest 232 correspond with the web-location information, a null set may be returned to the second search engine 280. The null set typically indicates that no suggested search terms are to be displayed. Accordingly, the second search engine 280 may leave the search box of the toolbar blank, thereby refraining from providing the user with a keyword for use as guidance in continued searching. Or, the second search engine 280 may employ other content for presentation within the search box, such as language drawn from another search engine as discussed below.

If the null set is returned, in embodiments, content may be provided within the search box. That is, as opposed to leaving the search box of the toolbar blank when the subject URL is unmatched at the manifest 232, second search engine 280 may enter a ghosting mode. Typically, the ghosting mode shows content (e.g., query or link) that mirrors the query or link submitted to the first search engine 275. However, ghosting mode may be exited upon the second search engine 280 identifying matching entries within the manifest 232. In this case, the toolbar reverts back to showing related searches 299.

Figure 3:
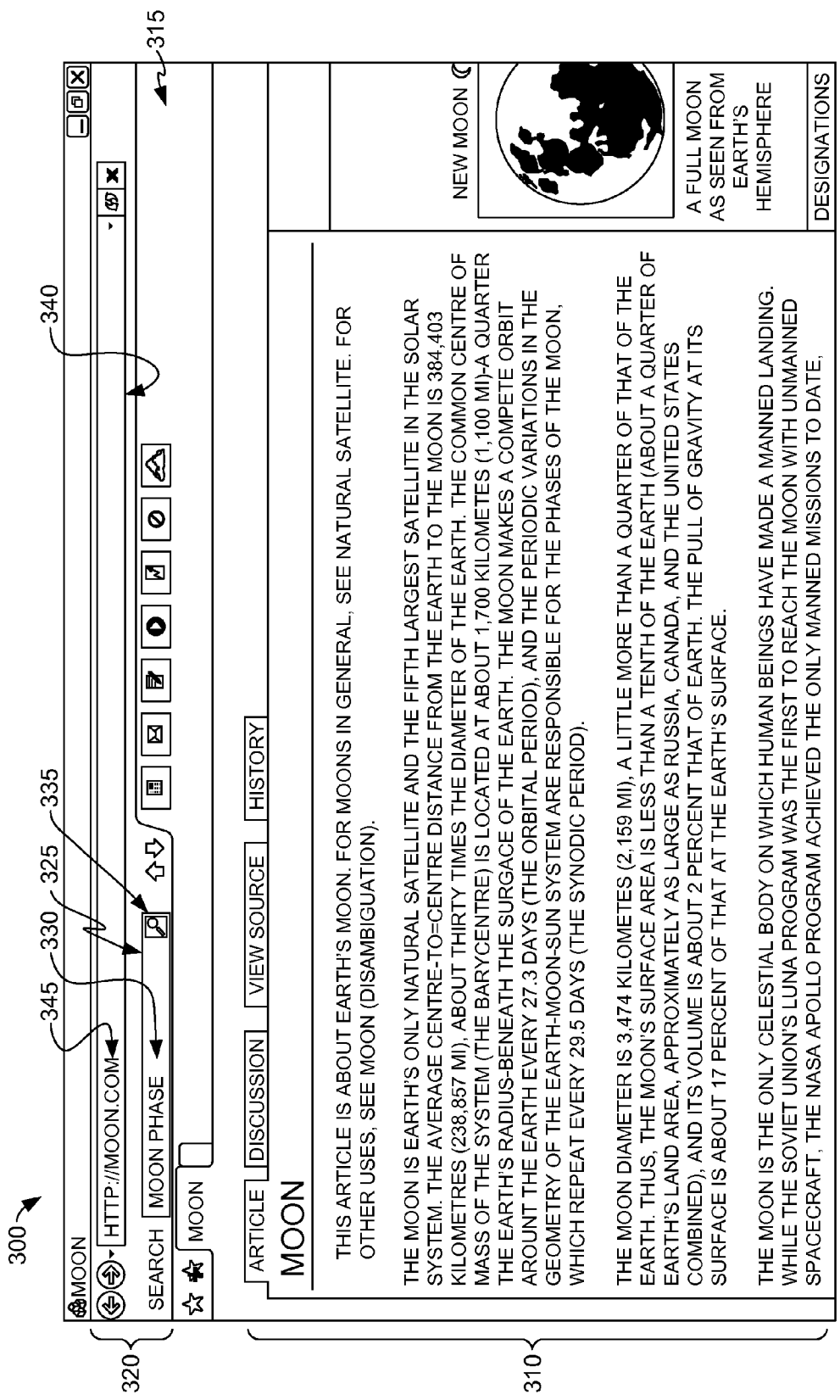
FIGS. 3-8 depict illustrative screen displays of exemplary user interfaces for presenting related searches to a user via a search box within a toolbar, in accordance with embodiments of the present invention.

If multiple keywords/queries are returned as part of the related searches 299, the keywords/queries may be pruned to a predefined threshold number and ranked. In one instance, the lower ranked keywords/queries are trimmed from the related searches 299 based on, in part, a size of a display area (e.g., menu 510 of FIG. 5) allocated for revealing the related searches 299. In another instance, the ranking is carried out using a ranking model that organizes the related searches 299 from highest to lowest relevance with respect to the web-location information (e.g., subject URL). This ranking may be employed to select an initial keyword (e.g., keyword "moon phase" 330 of FIG. 3) for display in the search box. In an exemplary embodiment, the keyword that is ranked as being of highest relevance (e.g., most popular) to the subject URL in comparison to a remainder of the related searches 299 is selected for display within the search box of the toolbar.

Turning now to FIGS. 3-8, illustrative screen displays of exemplary user interfaces 300, 400, 500, 600, 700, and 800 for presenting related searches to a user via a search box within a toolbar are shown. The exemplary user interfaces 300, 400, 500, 600, 700, and 800 are rendered in accordance with embodiments of the present invention, and are not meant to limit the scope of representations that can express related searches. Initially, with respect to FIG. 3, the exemplary user interface 300 includes a navigated-to online location 315 (e.g., web page within the Wikipedia® website that addresses the moon) that has content 310 and a subject URL "HTTP://MOON.COM" 345 associated therewith. As discussed above, the first search engine 275 is typically utilized to navigate the user to the online location 315 upon either entry of the subject URL 345 to a search bar 340 or selection of a link on a previous search-results page.

Further, the exemplary user interface 300 includes a toolbar 320 with a search box 325. Because the toolbar 320 is represented as being installed and active within the web browser application (e.g., as an add-on), the search box 330 is adapted to present the keyword "moon phase" 330, as a result of backend operation(s) of a search-based keyword tool. Further, a control button 335 is shown that, upon actuation, operates to submit the keyword 330 as a query to the second search engine 280, which manages the search box 325. As discussed above, the keyword 330 may be selected from a set of suggested search terms (e.g., related searches 299 of FIG. 2). In the exemplary user interface 300, the keyword 325 may be a search term/phrase of highest relevance to the subject URL 345, a most-popular search in the user's field of interest (based on a context of the search session), an entity that corresponds with the subject URL, or an alternative selection from the suggested search terms.

Upon the user selecting the control button 335 (e.g., hovering a pointer 450 over the control button 335 and performing a click-action), the keyword 330 is entered and submitted as a query to a second search engine managing the toolbar. Consequently, the second search engine (e.g., utilizing the second search engine of FIG. 2) is activated to conduct a search and to generate search results 410 of FIG. 4 related to the keyword 330. That is, the currently active keyword 330 in the search box 325 is employed to conduct a new search when the user clicks the control button 335. Accordingly, the user is relieved of the duty of retyping the keyword 330 into the search bar 340.

Figure 4:
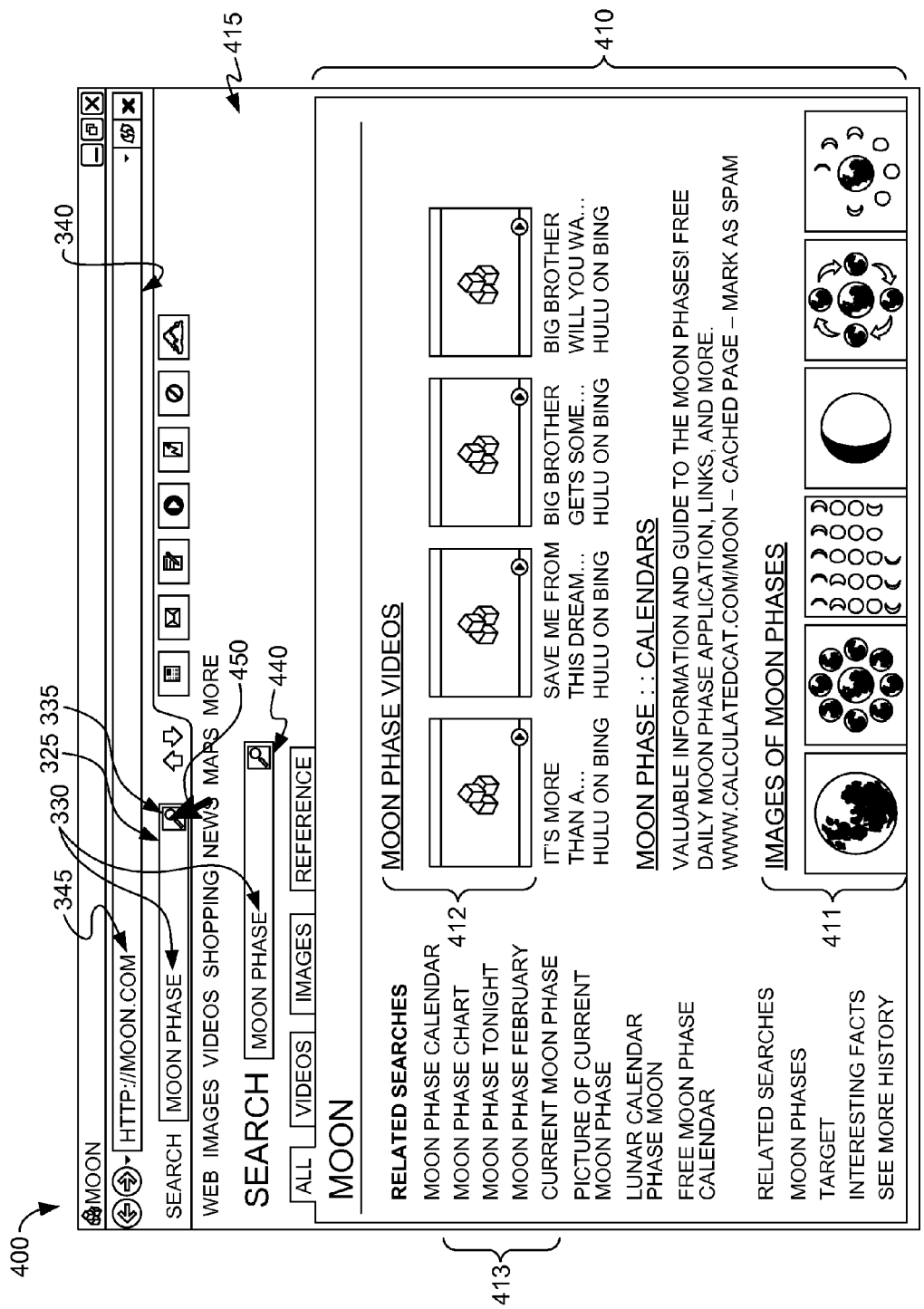

Turning now to FIG. 4, an exemplary user interface 400 is shown that includes a display area with a search-results page 415 and a set of related searches 413. As illustrated, the first search engine that originally was employed for navigation has been usurped by the second search engine, which is now instructing the web-browsing application to visit the search-results page 413 constructed by the second search engine. This search-results page 415 includes content 410 that is retrieved based on the keyword "moon phase" 330, which was previously submitted via the toolbar 320 of FIG. 3 and executed as a query using the second search service. As shown, the content 410 includes a set of images 411 of moon phases and a set of videos 412 of moon phases.

Further, in embodiments, the search-results page 415 may include a query-entry area 440 with the keyword "moon phase" 330 automatically populated therein (demonstrating to the user how the content 410 was arrived upon) and may include a set of suggested search terms 413 that were generated via the search-based keyword tool (e.g., backend API 285). With regard to the suggested search terms 413, as mentioned above, the related searches are determined as a function of some web-location information and then pruned based on one or more criteria (e.g., popularity, frequency, recentness, and the like). The keyword 330 is identified based one or more criteria (e.g., being most relevant to the web-location information), while a remainder of the pruned related searches are cached for eventual access. This remainder of the pruned related searches, in embodiments, is designated as the suggested search terms 413 and presented within the content 410 on the search-results page 415. Accordingly, because the second search engine has access to the cached suggested search terms 413 and has also taken control of rendering the subject matter within the user interface 400, the suggested search terms 413 may be displayed within the content 410 of the user interface 400.

Figure 5:
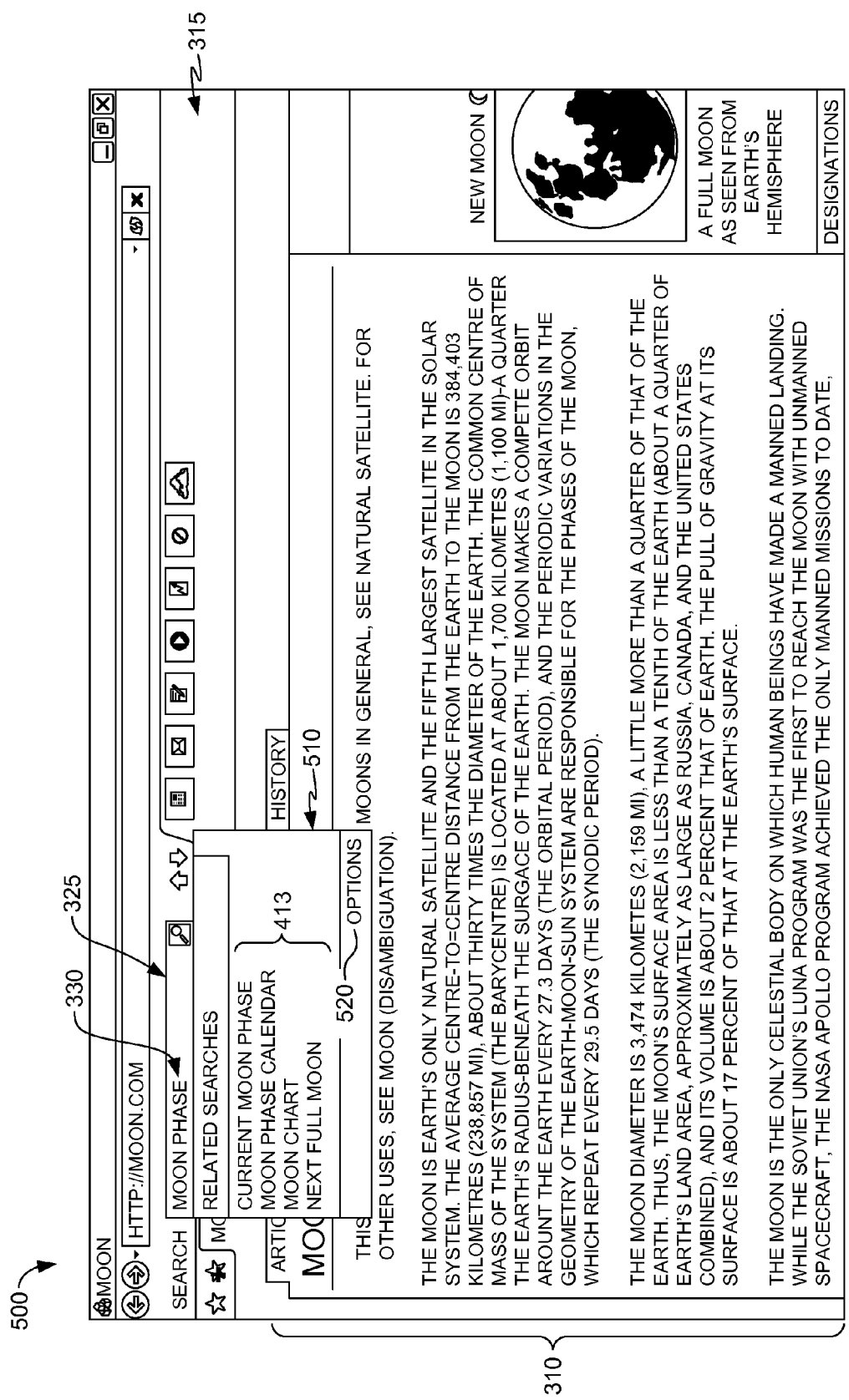

In contrast, with respect to the embodiments of FIG. 5, the first search engine is currently providing the web-browser application with the subject matter to display on the user interface 500. However, the second search engine still retains control over the toolbar 320 of FIG. 3 and can manage various features associated therewith. For instance, the second search engine may be configured to present the cached suggested search terms 413 to a user upon the user interacting with the toolbar. In one instance, the user interaction involves a selection (e.g., click-action using a mouse) within the search box 325. However, any number of user interactions with the toolbar may cause the suggested search terms 413 to be displayed, and embodiments of the present invention are not limited to the exemplary user-initiated selection(s) described herein.

In addition, the suggested search terms 413 may be displayed in any format that is available in the field of search technology. As shown, the suggested search terms 413 are presenting as a listing within a menu 510. This menu 510 may be a drop-down menu anchored from the toolbar 320, a pop-up window that obscures a portion of the content 310, or any other display-area configuration that holds at least a portion of the suggested search terms 413. Further, the suggested search terms 413 of the listing may be configured as destination links that, when selected upon, navigate the user to a search-results page that is constructed for the selected search term. Thus, upon selecting a search term, the second search engine assumes control over the subject matter displayed within the user interface 500 and is responsible for retrieving content related to the selected search term in the same way the second search engine would address an executed query composed of the selected search term.

Figure 6:
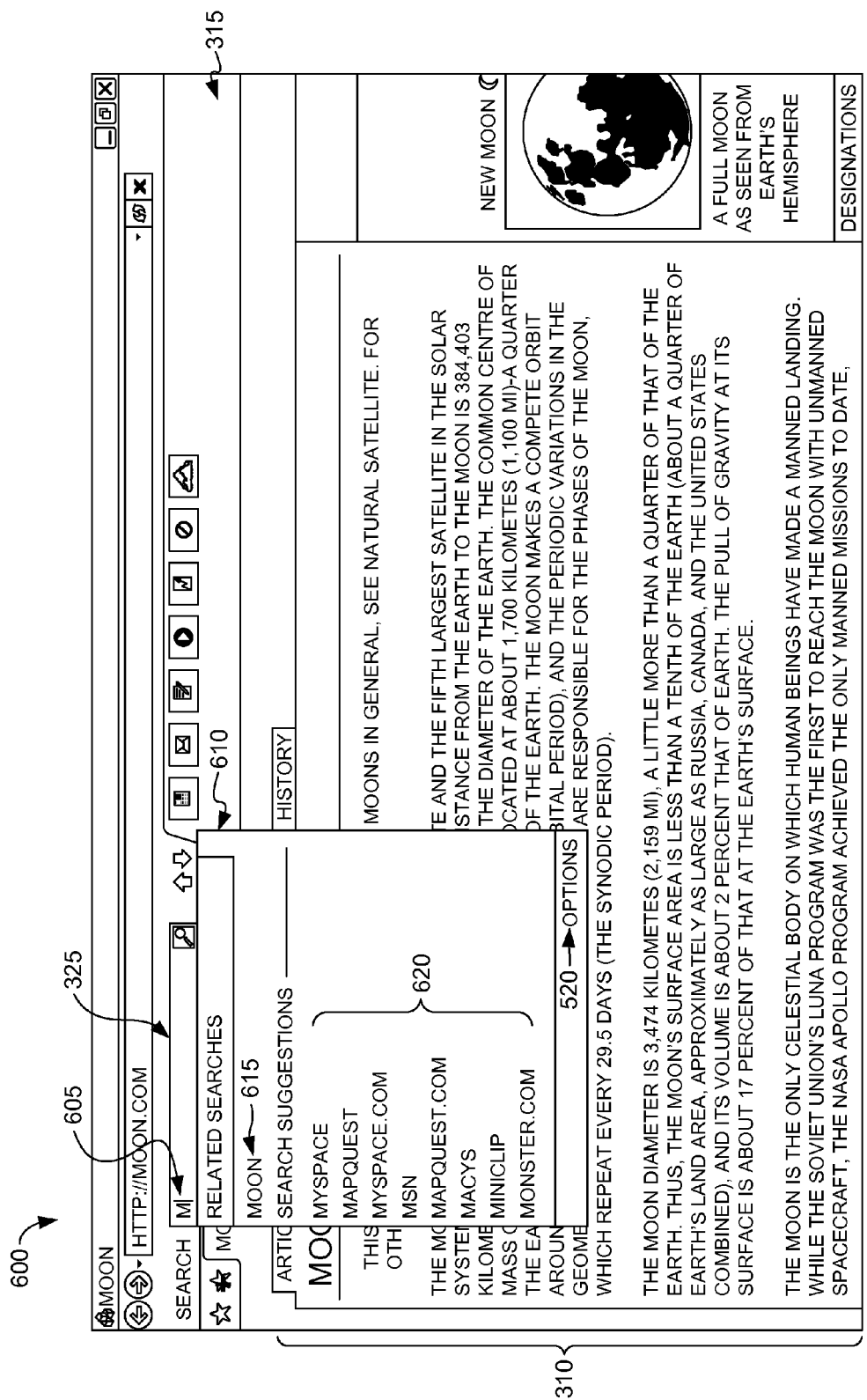
Figure 7:
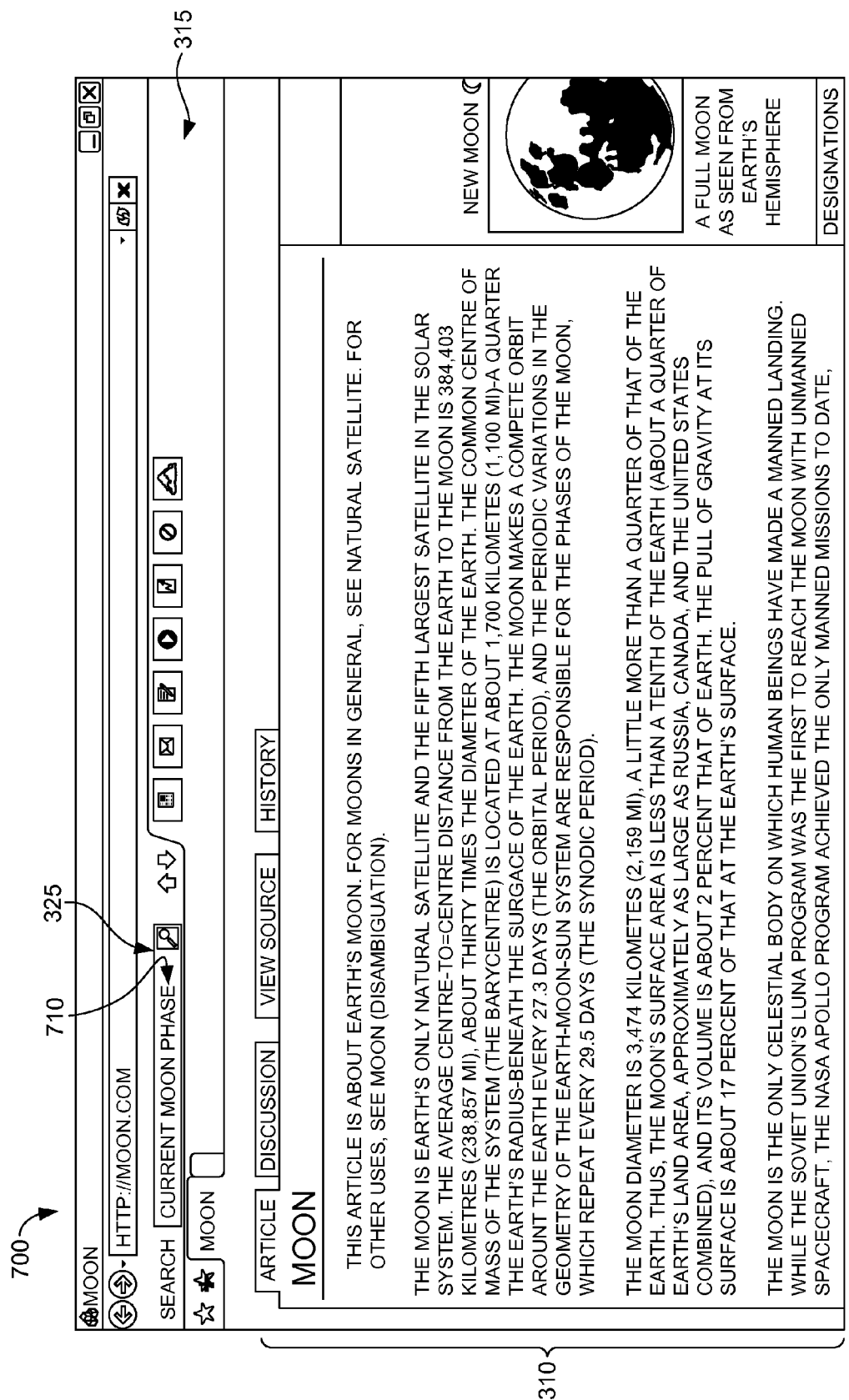

Turning now to FIG. 6, an exemplary user interface 600 is illustrated that depicts a situation where a user has selected or focused upon the search box 325 and begun editing the keyword 330. This edited keyword "M" 605 may trigger the toolbar 320 to perform one or more tasks. For example, the toolbar 320 may present a menu 610 that includes recommendations within the display area thereof. These recommendations may include one or more of the suggested search terms 615 and/or predictive queries 620, which are typically popular queries that begin with the same letters as the edited keyword 605. Thus, in operation, when the user starts typing in the search box 325, the menu 610 may employ auto-suggest logic to recommend text for use as the query, thereby allowing the user to manipulate the selected keyword 330, or any other suggested search term 413, prior to entry as a query.

Also, the menu 610 may include an "options" link 520 that allows a user to examine and alter properties of the menu 610. Accordingly, the user is provided the opportunity to modify the content and format of the menu 610 upon selecting the link 520. For example, the user may be prompted to decide whether the suggested search terms 413 are filtered and ranked based on a ranking of relevance to the web-location information or based on a level of variance between the suggested search terms 413, in order to provide the user with distinct options in which to refine the initial search (i.e., supplying a greater scope of choices).

With reference to FIG. 6, the exemplary user interface 700 depicts a feature of dynamically cycling the suggested search terms 413 within the search box 325, as opposed statically posting just the selected keyword 330. As shown, a candidate search term "current moon phase" 710 from the suggested search terms 413 is rotated into the search box 325. In embodiments, the cached suggested search terms 413 are individually and iteratively rotated through the search box 325. The transition from one candidate search term 710 to the next may be based on the expiration of a predefined time-frame. This predefined time frame may be consistent for each of the suggested search terms 413, or may vary across the related searches. For instance, the highest-ranked term(s) (e.g., selected keyword 330) may linger within the search box 325 for longer than lower-ranked term(s) (e.g., suggested search terms 413). In an exemplary embodiment, rotating the related searches within the search box 325 may involve one or more of the following steps: displaying the selected keyword 330 within the search box 325 for a first predefined period of time; upon expiration of the first predefined period of time, replacing within the search box 325 the selected keyword 330 with a first candidate (e.g., candidate search term "current moon phase" 710) from a remainder of the suggested search terms 413; displaying the first candidate from the remainder of the suggested search terms 413 within the search box 325 for a second predefined period of time; and, upon expiration of the second predefined period of time, replacing within the search box 325 the first candidate with a second candidate from the remainder of the suggested search terms 413.

Figure 8:
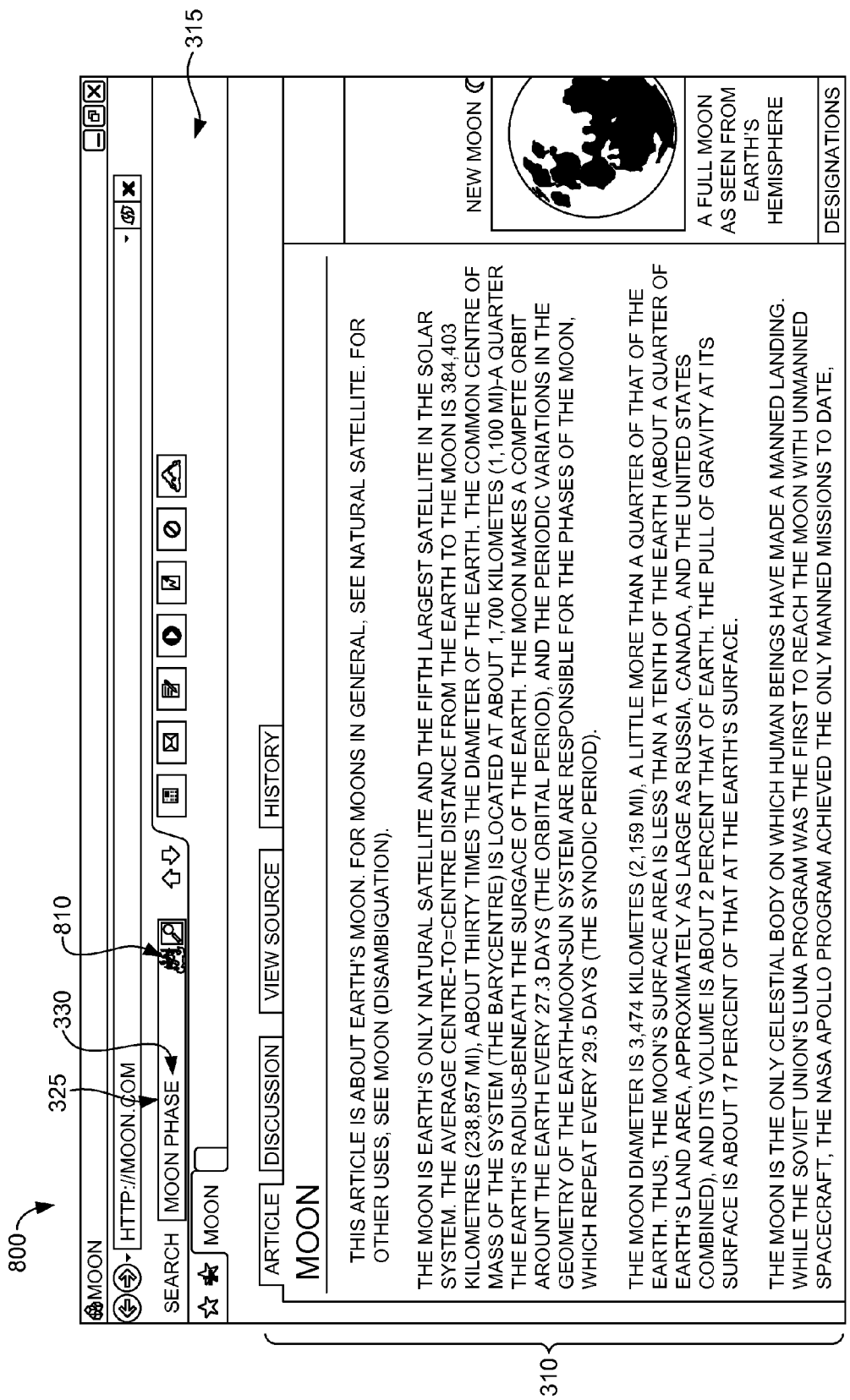

Turning to FIG. 8, the exemplary user interface 800 illustrates a highlighting feature 810 that accompanies the keyword 330 within the search box 325. This feature 810 is designed to draw the user's attention to the toolbar 320 and alert the user that a keyword 325 from a second search engine is being offered as an alternative to any related searches that the first search engine has presented within the content 310. This feature 810 may be any type of visual effects, such as a glowing area, flames, a fixed image, a video, color changes, a change in font or format of the keyword 330, an audio signal, or a non-intrusive effect. Further, the text of the keyword may be displayed in any manner known in the art, such as a subtle format (e.g., light grey and italicized) to designate the keyword 330 is simply a suggestion.

Figure 9:
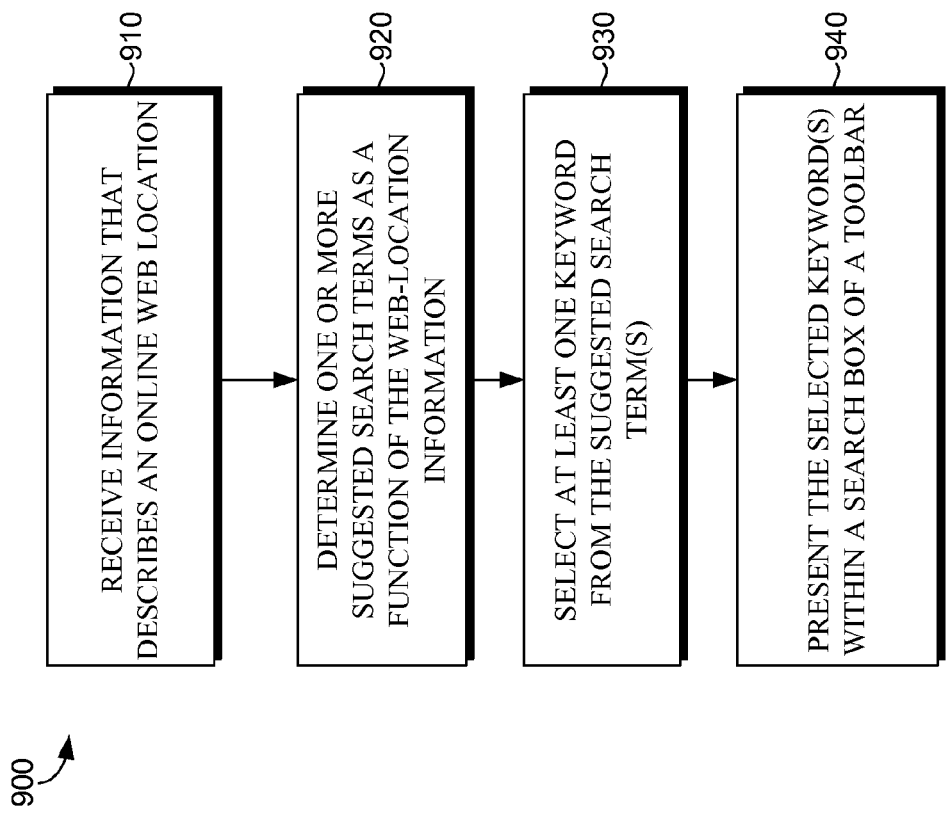
FIG. 9 is a flow diagram illustrating an overall method for surfacing keyword(s), which are selected from one or more suggested search terms, within a search box of a toolbar, in accordance with an embodiment of the present invention.

Turning to FIG. 9, a flow diagram is illustrated showing an overall method 900 for surfacing keyword(s), which are selected from one or more suggested search terms, within a search box of a toolbar, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the method 900 includes receiving information that describes an online web location, as depicted at block 910. This information may include the URL of a web page or website the user is presently visiting or attempting to navigate towards. In one instance, as depicted at block 920, one or more suggested search terms are determined as a function of the web-location information. At least one keyword is selected from the suggested search term(s), as depicted at block 930. This selected keyword may then be presented within the search box of the toolbar, upon the user viewing content of the web page or website targeted by the URL, as depicted at block 940.

Figure 10:
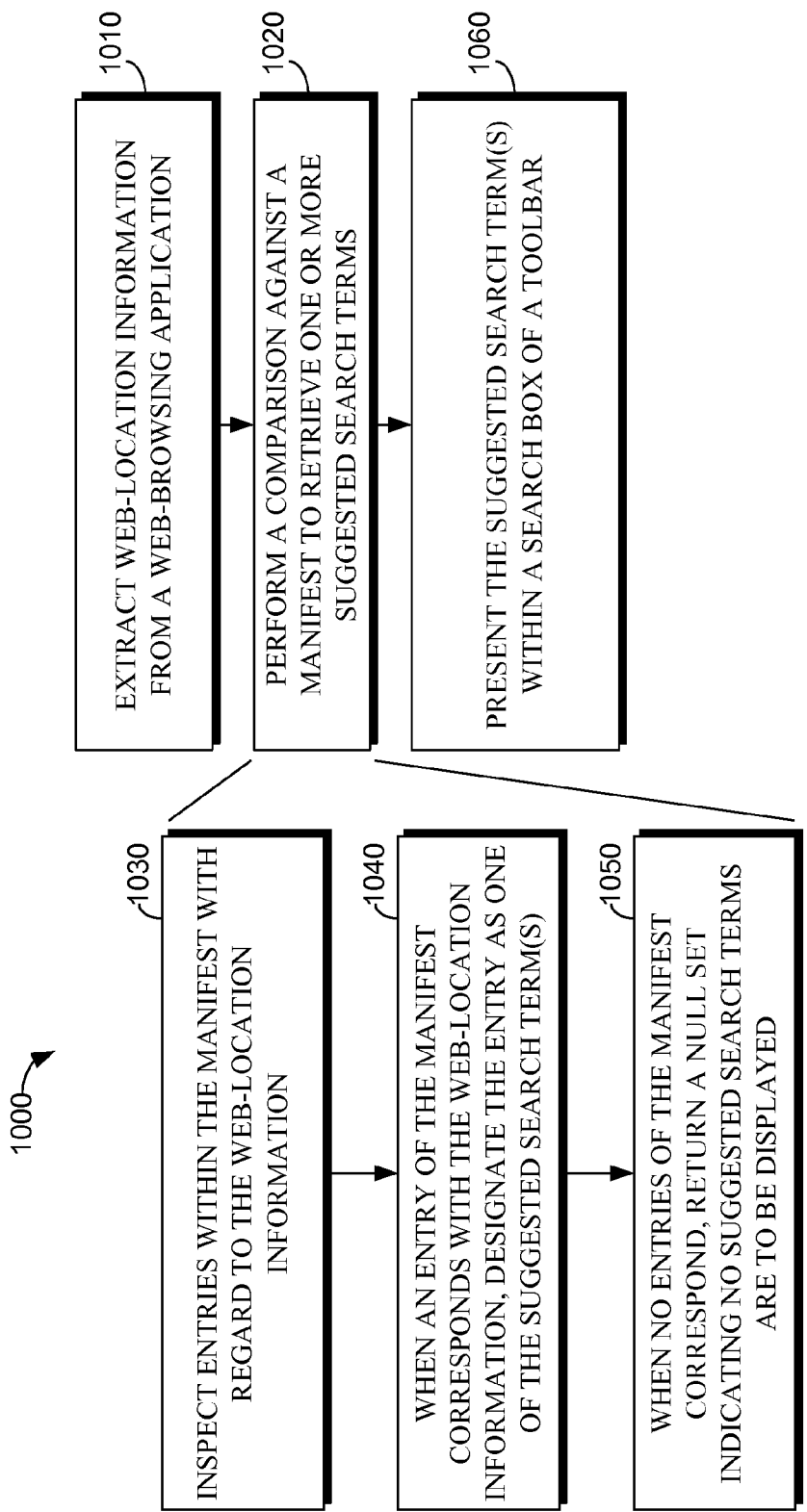
FIG. 10 is a flow diagram illustrating an overall method for automatically providing a user with one or more suggested search terms on a UI display, in accordance with an embodiment of the present invention.

With reference to FIG. 10, a flow diagram illustrating an overall method 1000 for automatically providing a user with one or more suggested search terms on a UI display is shown, in accordance with an embodiment of the present invention. The method 1000 includes extracting web-location information from a web-browsing application, as depicted at block 1010. In embodiments, the web-location information may include a URL of a website the user is currently visiting. As depicted at block 1020, the method 1000 may additionally include performing a comparison against a manifest to retrieve the suggested search term(s).

In an exemplary embodiment, performing the comparison involves one or more of the following steps: inspecting entries within the manifest with regard to the web-location information (see block 1030); and, when an entry of the manifest corresponds with the web-location information, designating the entry as one of the suggested search term(s) (see block 1040). In the alternative, as depicted at block 1050, when no entries of the manifest correspond with the web-location information, the method 1000 includes returning a null set that indicates no suggested search terms are to be displayed. In this case, a search box of a toolbar is left empty. However, when there exists suggested search term(s), as depicted at block 1060, one or more of these suggested search term(s) may be presented within the search box of a toolbar. Thus, related searches that help users focus their search sessions are placed in an intuitive location on the toolbar and are configured to launch a new query without being retyped by the users.

Although embodiments of the present invention are described in relation to related search(es) being presented within a search box of a toolbar, other embodiments contemplate variant mechanisms for notifying a user of the related search(es). For instance, a toolbar-based navigation menu that accompanies a web-browsing application may be surfaced for displaying the related search(es). This navigation menu may be managed by a third-party interactive program installed locally or remotely, which interfaces between the user and a search service that is responsible for generating the related searches. In one example, the navigation menu may comprise a pop-up window displayed on top of HTML-document content in a browser window. In another example, a wing may be surfaced for a limited amount, where the wing surfaces the related search(es) by imposing upon content around a border of the browser window before vanishing. Typically, the wing is surfaced a predefined amount of times to educate the user that related search(es) are being automatically generated in the background during the search session and, potentially, being presented in the toolbar.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer storage hardware devices having computer-executable instructions embodied thereon that, is executed, perform a method for surfacing one or more suggested search terms within a search box of a toolbar, the method comprising:

receiving information that describes an online web location;

extracting a uniform resource location (URL) of a website that a user is currently visiting corresponding to the online web location;

determining the one or more suggested search terms directly from the URL, wherein the one or more suggested search terms enable performance of related searches;

selecting at least one keyword from the one or more suggested search terms, wherein selecting the at least one keyword from the one or more suggested search terms comprises (a) identifying the at least one keyword as being most relevant to the web-location information, and (b) caching a remainder of the one or more suggested search terms for access by a user at the toolbar; and presenting the at least one selected keyword within the search box of the toolbar for selection by a user to initiate at least one of the related searches, wherein presenting the at least one selected keyword within the search box of the toolbar comprises (a) displaying the at least one selected keyword within the search box for a predefined period of time, and (b) upon expiration of the predefined period of time, replacing within the search box the at least one selected keyword with a first candidate from the remainder of the one or more suggested search terms.

2. The one or more computer storage hardware devices of claim 1, wherein determining the one or more suggested search terms comprises calling a backend application programming interface (API) with the URL.

3. The one or more computer storage hardware devices of claim 2, wherein determining the one or more suggested search terms further comprises receiving the one or more suggested search terms related to the URL from the backend API.

4. The computer system of claim 2, further comprising:
receiving an indication of a user-initiated selection at the toolbar; and
rendering a menu that lists the remainder of the one or more suggested search terms.

5. The one or more computer storage hardware devices of claim 1, wherein the online web location represents a web page of a website to which a user has presently navigated.

6. The one or more computer storage hardware devices of claim 5, the method further comprising employing a first search engine, operated by a first web-search service, to navigate the user to the website.

7. The one or more computer storage hardware devices of claim 6, the method further comprising employing a second search engine, operated by a second web-search service, to manage content presented within the search box of the toolbar.

8. The one or more computer storage hardware devices of claim 6, wherein the online web location represents a search results page that is retrieved in response to a user-initiated query submitted to the first search engine.

9. The one or more computer storage hardware devices of claim 1, wherein presenting the at least one selected keyword within the search box of the toolbar further comprises:
displaying the first candidate from the remainder of the one or more suggested search terms within the search box for a predefined period of time; and
upon expiration of the predefined period of time, replacing within the search box the first candidate from the remainder of the one or more suggested search terms with a second candidate from the remainder of the one or more suggested search terms.

10. The one or more computer storage hardware devices of claim 1, wherein the method further comprises:
receiving an indication of a user-initiated selection at the toolbar; and
rendering a menu that lists the remainder of the one or more suggested search terms.

11. The one or more computer storage hardware devices of claim 10, wherein receiving an indication of a user-initiated selection at the toolbar comprises detecting a single click-action directed at the search box.

12. The one or more computer storage hardware devices of claim 1, wherein the method further comprises:
receiving an indication of a user-initiated selection at the toolbar; and
allowing the user to edit the at least one selected keyword prior to entry as a query.

13. The one or more computer storage hardware devices of claim 12, wherein receiving an indication of a user-initiated selection at the toolbar comprises detecting a multiple click-action directed at the search box.

14. A computerized method, implemented at a processing unit, for automatically providing a user with one or more suggested search terms, the method comprising:

extracting a uniform resource locator (URL) of a website that a user is currently visiting from a web-browsing application;
performing a comparison of the URL itself against a manifest that lists URLs having associated search terms in order to retrieve the one or more suggested search terms that enable performance of related searches, and wherein performing the comparison comprises:
(a) inspecting entries within the manifest with regard to the URL, wherein the entries within the manifest are preselected URLs;
(b) when an entry of the manifest corresponds with the URL, designating the entry as the one or more suggested search terms and selecting at least one keyword from the one or more suggested search terms, wherein selecting the at least one keyword from the one or more suggested search terms comprises
1) identifying the at least one keyword as being most relevant to the web-location information, and
2) caching a remainder of the one or more suggested search terms for access by a user at a toolbar; and
(c) when no entries of the manifest correspond with the URL, returning a null set that indicates no suggested search terms are to be displayed; and
presenting the at least one keyword within a search box of the toolbar, the at least one keyword being selectable by the user, wherein the toolbar is surfaced at a user interface display upon invoking the web-browsing application, wherein presenting the at least one selected keyword within the search box of the toolbar comprises
(a) displaying the at least one selected keyword within the search box for a predefined period of time, and
(b) upon expiration of the predefined period of time, replacing within the search box the at least one selected keyword with a first candidate from the remainder of the one or more suggested search terms.

15. The computerized method of claim 14, further comprising maintaining the search box void of content upon the null set being returned.

16. The computerized method of claim 14, wherein presenting the at least one keyword within the search box of the toolbar comprises accompanying the at least one keyword with visual effects that draw the user's attention to the at least one keyword.

17. The computerized method of claim 14, wherein extracting the URL of the website that the user is currently visiting from a web-browser application comprises:
recognizing a user-initiated selection of a destination link on a search-results page; and
employing the URL associated with the destination link or indicia of a document targeted by the destination link as the URL that the user is currently visiting.

18. The computerized method of claim 14, further comprising:
receiving an indication of a user-initiated selection at the toolbar; and
rendering a menu that lists the remainder of the one or more suggested search terms.

19. A computer system capable of discovering and presenting one or more suggested search terms within a toolbar is provided, the computer system comprising a computer storage medium having a plurality of computer software components embodied thereon that are executed by a processor, the computer software components comprising:
a web-browsing application to receive a user-initiated selection directed to a destination link that initiates navigation to a web location;

a first search engine, operated by a first web-search service, to navigate the user to the web-location targeted by a uniform resource locator (URL); and a second search engine, operated by a second web-search service, to manage content presented within a search box of the toolbar; wherein managing content comprises:

(a) from the URL itself of a website that the user is currently visiting, determining one or more suggested search terms that enable performance of related searches;

(b) selecting at least one keyword from the one or more suggested search terms, wherein the at least one selected keyword is ranked as being of highest relevance to the URL itself of the website that the user is currently visiting in comparison to a remainder of the one or more suggested search terms;

(c) caching a remainder of the one or more suggested search terms for access by a user at the toolbar; and (d) presenting the at least one selected keyword within the search box of the toolbar, the at least one selected keyword being selectable by the user, wherein presenting the at least one selected keyword within the search box of the toolbar comprises
1) displaying the at least one selected keyword within the search box for a predefined period of time, and
2) upon expiration of the predefined period of time, replacing within the search box the at least one selected keyword with a first candidate from the remainder of the one or more suggested search terms.

20. The computer system of claim 19, wherein determining the one or more suggested search terms further comprises extracting the one or more suggested search terms directly from the URL itself of the website that the user is currently visiting.

* * * * *